(12) United States Patent
Ullmann et al.

(10) Patent No.: US 11,106,319 B2
(45) Date of Patent: Aug. 31, 2021

(54) LAYER ELECTRODE FOR TOUCH SCREEN

(71) Applicant: PolyIC GmbH & Co. KG, Fürth (DE)

(72) Inventors: Andreas Ullmann, Zirndorf (DE);
Manfred Walter, Nuremberg (DE);
Mathias Gruber, Cadolzburg (DE)

(73) Assignee: POLYIC GMBH & CO. KG, Furth (DE)

( * ) Notice: Subject to any disclaimer, the term of this patent is extended or adjusted under 35 U.S.C. 154(b) by 0 days.

(21) Appl. No.: 16/639,939

(22) PCT Filed: Jul. 23, 2018

(86) PCT No.: PCT/EP2018/069922
§ 371 (c)(1),
(2) Date: Feb. 18, 2020

(87) PCT Pub. No.: WO2019/034375
PCT Pub. Date: Feb. 21, 2019

(65) Prior Publication Data
US 2020/0249794 A1    Aug. 6, 2020

(30) Foreign Application Priority Data
Aug. 18, 2017    (DE) .......................... 102017118937.8

(51) Int. Cl.
| G06F 3/041 | (2006.01) |
| G06F 3/045 | (2006.01) |
| G06F 3/044 | (2006.01) |

(52) U.S. Cl.
CPC .......... G06F 3/0443 (2019.05); G06F 3/0446 (2019.05); G06F 3/04164 (2019.05); *G06F 2203/04111* (2013.01); *G06F 2203/04112* (2013.01)

(58) Field of Classification Search
CPC ....... G06F 3/0446; G06F 3/044; G06F 3/0443
See application file for complete search history.

(56) References Cited

U.S. PATENT DOCUMENTS

| 2009/0194344 A1 | 8/2009 | Harley et al. |
| 2012/0182233 A1* | 7/2012 | Kim ...................... G06F 3/0446 345/173 |
| 2012/0193130 A1 | 8/2012 | Fix et al. |
| 2014/0202840 A1 | 7/2014 | Fix et al. |
| 2014/0211102 A1 | 7/2014 | Kang et al. |
| 2015/0094974 A1 | 4/2015 | Backes |
| 2015/0378390 A1 | 12/2015 | Liu et al. |

(Continued)

FOREIGN PATENT DOCUMENTS

| DE | 102009014757 A1 | 10/2010 |
| DE | 102012006546 A1 | 10/2013 |

(Continued)

*Primary Examiner* — Nan-Ying Yang
(74) *Attorney, Agent, or Firm* — Hoffmann & Baron, LLP

(57) ABSTRACT

A layer electrode for touchscreens, in particular one which is suitable for the construction of capacitive touchscreens, wherein the detection accuracy of the touchscreen is virtually independent of an increase in the number of electrode arrays in the touchscreen. This is achieved in that, within the transparent field of view of the touchscreen, conductivity centres are formed through first electrode arrays which are connected directly to supply lines into the edge region and to a controller.

13 Claims, 9 Drawing Sheets

(56) References Cited

U.S. PATENT DOCUMENTS

2016/0034071 A1*  2/2016  Jee ........................ G06F 3/044
                                                    345/174
2016/0077632 A1   3/2016  Ullmann et al.
2016/0154517 A1   6/2016  Ullmann et al.
2016/0291790 A1  10/2016  Yao
2017/0123572 A1*  5/2017  Song .................... G06F 3/0446

FOREIGN PATENT DOCUMENTS

| DE | 102013104640 A1 | 11/2014 |
| DE | 102013104644 A1 | 11/2014 |
| DE | 102015118039 A1 | 10/2016 |
| EP | 2734915 B1 | 7/2015 |

* cited by examiner

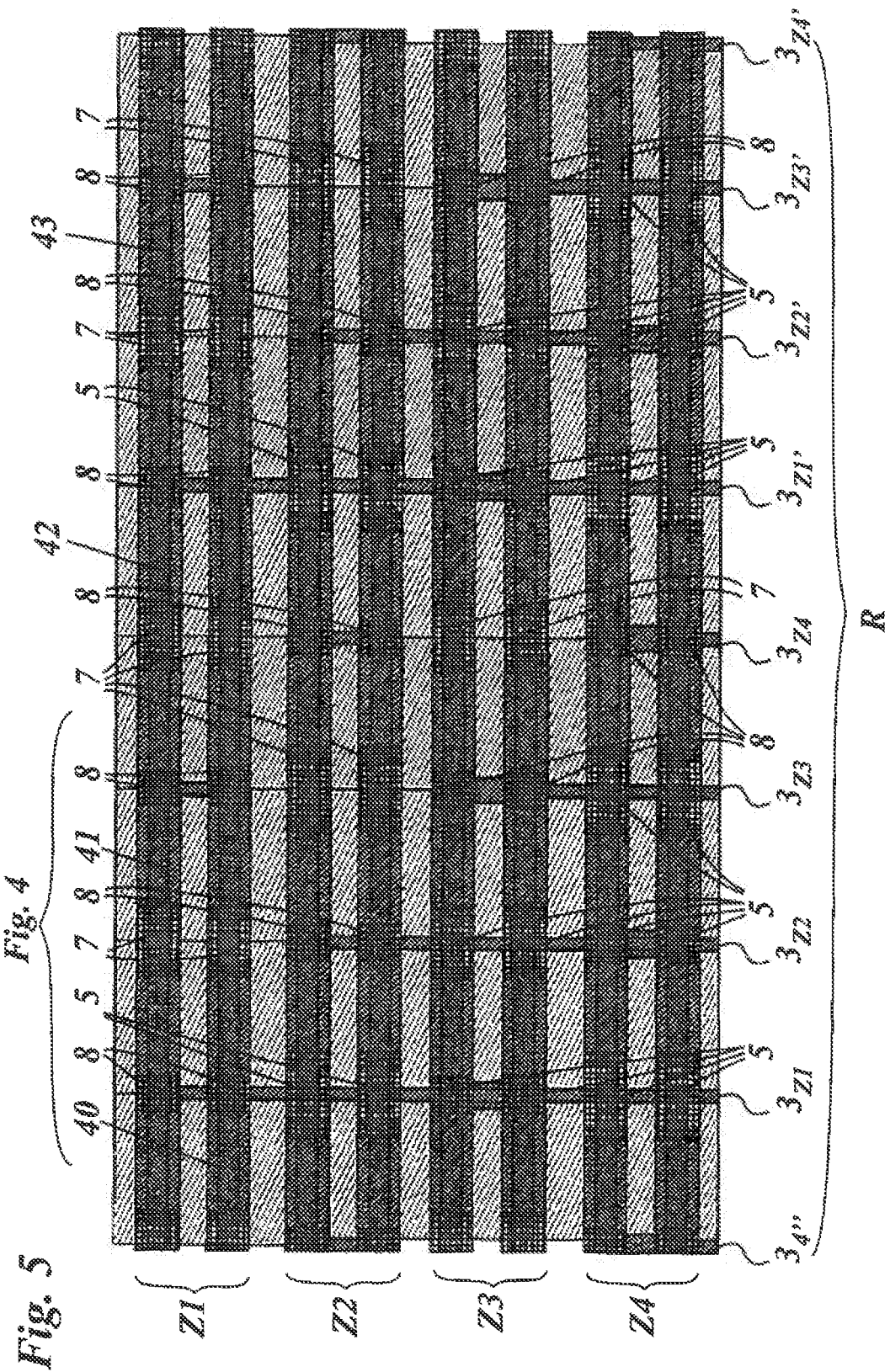

LAYER ELECTRODE FOR TOUCH SCREEN

This application claims priority based on an International Application filed under the Patent Cooperation Treaty, PCT/EP2018/069922, filed Jul. 23, 2018, which claims priority to DE 102017118937.8, filed Aug. 18, 2017.

BACKGROUND OF THE INVENTION

The invention relates to a layer electrode for touchscreens, in particular one which is suitable for the construction of capacitive touchscreens.

Such layer electrodes routinely comprise, on a first ply, a first and second conductive region of the receiver electrodes which are adjacent but spaced apart from each other by galvanic isolations, and a conductive region of the transmitter electrodes. The respective electrodes cover the entire usable surface of the touchscreen, and can be contacted by supply lines which are routed, bundled, to corresponding control electronics. The usable surface of the touchscreen is correspondingly divided into an active electrode-array surface which corresponds to the surface which is covered with transmitter and receiver electrodes, and an inactive surface which is covered with the respective supply lines to the electrode surfaces and galvanic isolations between conductive regions.

A disadvantage of the previously known arrangements of electrode arrays on—in particular single-ply—layer electrodes is their high susceptibility to interfering signals in the edge region, which are triggered by supply lines, in particular by bundles of supply lines.

From DE 10 2013 104 644 A1 a layer electrode is already known, which indicates a solution as to how, in the case of a growing number of electrode arrays within the layer electrode, the thickness of the bundle of supply lines can be reduced by changing their arrangement. Nevertheless, the problem remains that, with a growing number of electrode arrays, their contacting by supply lines has a disadvantageous effect on the reliability of the electrode arrays in the outer part of the transparent region of a layer electrode closer to the edge region.

SUMMARY OF THE INVENTION

The object of the present invention is therefore to overcome the disadvantages of the state of the art and to create an arrangement of electrode arrays on a layer electrode, in which the thickness of the supply line bundle is kept as small as possible in the edge region.

This object is achieved by the present invention, as disclosed in the description, the claims and the figures.

Correspondingly, the subject-matter of the present invention is a layer electrode for a touchscreen, comprising an inner transparent region with electrode arrays, which are transmitter and/or receiver electrodes, and an edge region with supply lines, characterized in that supply lines, which lead into the edge region and to a controller, are provided only to first electrode arrays, and second electrode arrays are connected to first electrode arrays via galvanic bridges and are not connected directly to the supply lines.

Generally, the finding of the invention is that, through a galvanic bridging of the electrode arrays within the transparent region, the number of supply lines into the edge region can be drastically reduced. In addition, the number of electrode arrays in the transparent region is thus no longer relevant to the thickness of the supply line bundle, with the result than an increase in the number of the electrode arrays or touch fields of the layer electrode for a touchscreen then no longer—as hitherto according to the state of the art shown by way of example in FIG. 1—has a disadvantageous effect on the detection accuracy in the outer part of the transparent region.

According to an advantageous embodiment of the invention it is provided that a number of first electrode arrays is present in the inner transparent region, in order that above all the supply lines leading out of the central region of the touchscreen are limited to a minimum, with the result that the surface area of the electrode arrays is not reduced too greatly from the inside to the outside.

In the present case, the layer electrode is divided conceptually for example into a transparent inner region and a non-transparent outer region. The non-transparent outer region is used as edge region.

The edge region is a contact region and is characterized above all in that supply lines and/or reinforcement panels are provided here. It is already known to provide vias and/or bridges for the connection of supply lines in this region which is not used for input and therefore optionally not transparent.

According to an advantageous embodiment of the invention, the layer electrode is present in at least three plies, a first ply with electrode arrays, an isolating ply lying thereon, which has a structuring, in particular holes, for example in the form of vias, through which a third, electrically conductive ply on the isolating ply can galvanically bridge the electrode arrays of the first ply.

According to a further advantageous embodiment of the invention, electrically conductive bridges are present not only in the transparent region of the layer electrode, but also in the edge region of the layer electrode where the supply lines are located. It can be provided that the bridges in the edge region of the layer electrode are formed by the same plies as the bridges in the transparent region of the layer electrode.

According to an advantageous embodiment of the invention, the first ply is made of a transparent film which comprises a transparent carrier which is covered with non-transparent conducting tracks such that sufficient transparency for a touchscreen and at the same time electrical conductivity are guaranteed.

In particular, the electrode arrays in the transparent region are formed by covering with a pattern of electrically conductive, non-transparent tracks, wherein the conductive tracks consist of one material and are applied with a material thickness with which, when formed over the entire surface area by means of these materials, the first electrically conductive layer does not appear transparent to a human observer, and wherein the width of the tracks is selected such that the electrode arrays are transparent to the human eye.

The width of the non-transparent conductive tracks preferably lies in the range between 1 µm and 40 µm, preferably between 5 µm and 25 µm. The thickness of the non-transparent conductive tracks lies in the range between 3 mm and 5 µm, preferably between 40 nm and 1 µm.

The bottom ply forming the electrode arrays is in particular preferably made of the material which is also named "metal mesh" after its construction. This is in particular the applicant's film material, commercially available as "PolyTC®", which is known for example through DE 10 2009 014 757.8, the content of which is hereby incorporated in the present disclosure. According to another embodiment, the material of the bottom ply conductive in a structured way is selected from the transparent conductive materials such as indium tin oxide, abbreviated to "ITO", or similar metal oxides.

The material of the second ply, the isolating intermediate ply, can be any transparent synthetic organic polymeric or ceramic material, such as for example oxides, polyethylene (PE), polypropylene (PP), polyvinyl chloride (PVC), polystyrene (PS), polyester, polycarbonate and/or polyethylene terephthalate.

The second ply in particular preferably has a transparency which, in the overall construction of the at least three plies for a touchscreen, still guarantees a sufficient transparency for use in a touchscreen.

The material of the third ply forming the galvanic bridges can be any conductive material, preferably naturally transparent, thus once again for example PolyTC®, but also other, non-transparent electrically conductive material as "stand alone" or on thin carriers, such as plastic films, for example in nanodimensions and again for example incorporated therein, thus for example applied or incorporated so thinly that even a pure material—such as silver or copper—is transparent. Conductive polymer materials and/or nanotubes and/or non-metallic oxide nanoparticles are also suitable. On the other hand, the third ply can be producible by printing with an electrically conductive ink or paste, for example made of a carbon material such as for example a printable carbon paste, sinterable alloys, 2D- and/or 3D-printable metals or metal alloys, as well as nanowires, carbon black in all modifications etc. The selection of the material for the third ply also depends, for example, on the requirements for transparency in the respective case.

According to an advantageous embodiment, the first electrode arrays, which are connected directly to supply lines, are present distributed in the transparent region. According to a further advantageous embodiment of the invention, the first electrode arrays, which are connected directly to supply lines, are, rather, arranged centrally in the transparent region.

According to an advantageous embodiment of the invention, all the electrode arrays, thus also two first electrode arrays for example directly adjacent to each other, are present bridged. It happens, in particular, that the bridging does not form the direct line to an adjacent supply line, thus is electrically charged, but only serves as a redundant so-called "dummy bridge" or "blind bridge", for the optical harmonization of the layer electrode of the touchscreen.

This is a particularly preferred embodiment because, through complete bridging of the electrode arrays in the transparent region, a particularly good optical homogeneity of the layer electrode can be produced.

According to another advantageous embodiment of the invention, in addition to bridged electrode arrays, first electrode arrays which are not bridged, directly connected to supply lines, are also present.

The electrode arrays are preferably arranged at least sometimes in rows. The supply lines are then particularly preferably arranged transversely to the rows. This means that the supply lines preferably extend substantially parallel to a first imaginary straight line and the rows preferably extend substantially parallel to a second imaginary straight line and the angle formed by the first and second straight lines is not equal to 180 degrees. It is then particularly preferred if the supply lines are arranged substantially perpendicular to the rows, thus the angle just defined lies in particular between 80 degrees and 100 degrees, and is preferably precisely 90 degrees.

According to an advantageous embodiment it is provided that an electrode array maximally distant from the supply line also has no more than 8 kΩ to 12 kΩ resistance accumulation, in particular no more than 10 kΩ.

Through the procedure proposed here, conductive centres form within the transparent region, which are connected to a controller via direct supply lines. The respective connections to the controllers are situated in the edge region, wherein the supply lines open into the edge region at different locations, for example at the top, at the bottom, in the centre, on the left and/or on the right on the transparent region.

BRIEF DESCRIPTION OF THE DRAWINGS

The invention will be explained in more detail in the following with reference to figures, which show on the one hand the state of the art and on the other hand selected embodiment examples of the invention.

FIG. 5 shows the extension of the overall view from FIG. 4 to an "8×4" matrix.

FIG. 1 shows the state of the art, as known from DE 10 2013 104 644 A1.

DETAILED DESCRIPTION OF THE PREFERRED EMBODIMENTS

Figure 1:
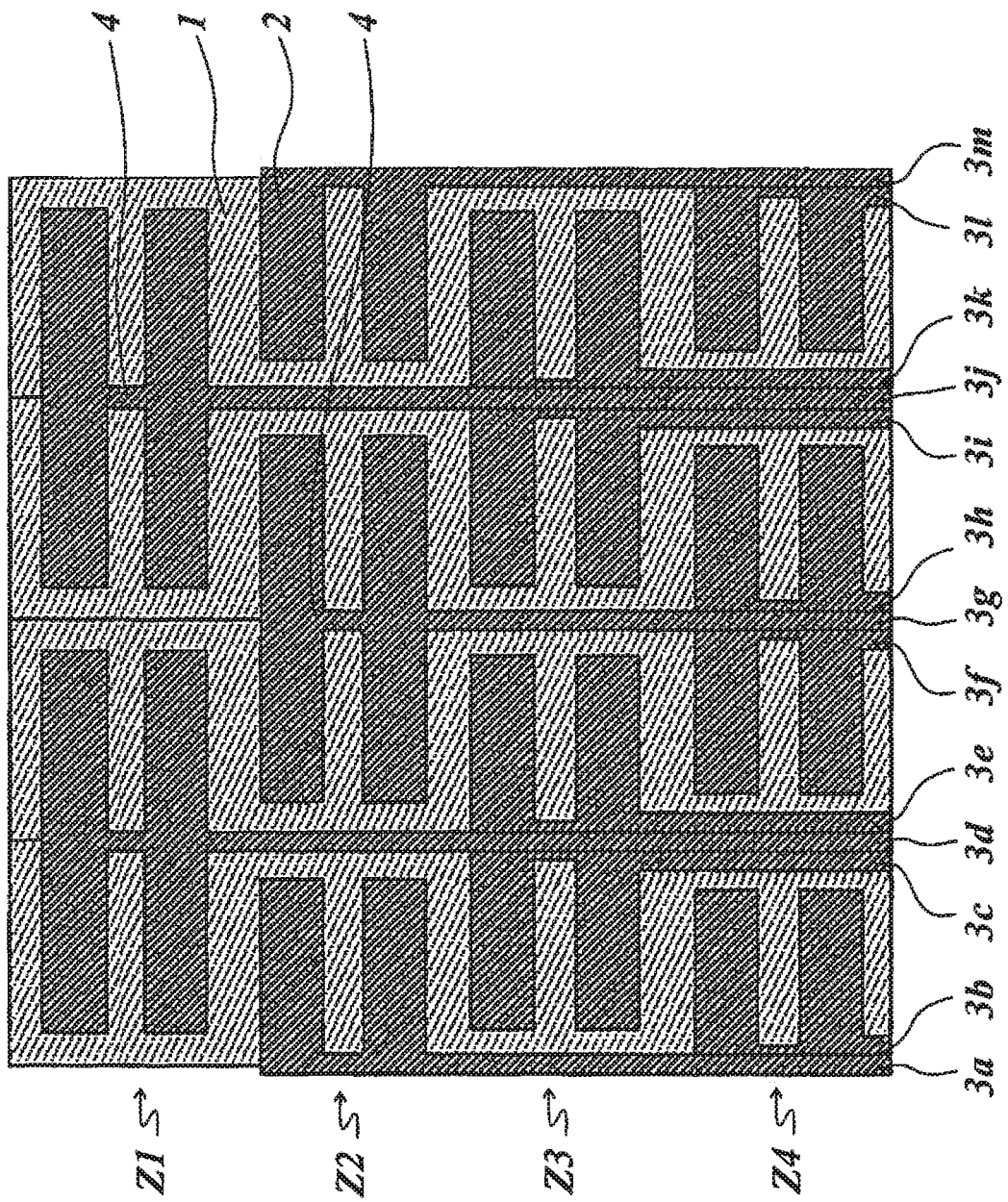
FIG. 1 shows a section of a layer electrode, as known from DE 10 2013 104 644 A1 and/or from EP 2 734 915 B1.

A section from the transparent region of the layer electrode with electrode arrays 1 for the electrode-receiver array and 2 for the electrode-transmitter array and supply lines 3a, 3b . . . to 3m can be recognized. The section from the single-ply layer electrode shown in FIG. 1, the matrix shown here, comprises 4 rows, Z1 to Z4. It can be recognized that even in the case of this small 4×4 matrix, the surface area of the electrode arrays 1 and 2 is already significantly reduced in the outer part, thus for example in Z4 of the transparent region of the layer electrode, by the surface area which the supply lines 3a to 3m cover. In the embodiment of the electrode arrays shown here, the transmitter electrodes 2 are formed in a meandering pattern, wherein the electrode subarrays, here two per each divided transmitter electrode, are connected to each other via electrically conductive bars 4. The transmitter electrodes 2 are surrounded by meandering receiver electrodes 1, from which they are galvanically isolated, and cooperate with the latter to form a touch field. The electrode arrays 1, 2 and supply lines 3a to 3m represented here lie in the same plane and are for example, or preferably, made of PolyTC®.

The supply lines 3a to 3m lead into an edge region of the layer electrode, which is not shown here and which can be made transparent with all the intermediate levels to non-transparent. In the edge region bridges and vias are also already partially provided according to the state of the art.

For example the layer electrode is present as a multi-layer body according to EP 2734915 B1, the disclosure content of which is hereby made the subject-matter of the present description, with a (see claim 1 there) first region transparent to the human eye with a plurality of electrode arrays arranged in the first region, also named touch fields, with a carrier substrate that is transparent at least in the first region, and with a partial electrically conductive first layer that is transparent to the human eye at least in the first region and which in the first region has electrically conductive transmitter regions, also named transmitter electrodes, receiver regions, also named receiver electrodes, and connecting regions, also named supply lines, which are in each case for example formed by a pattern of electrically conductive, non-transparent tracks, in which the conductive tracks consist of one material and are applied with a material thickness, with which, when formed over the entire surface are by means of these materials, the first electrically conductive layer does not appear transparent to a human observer, and wherein the width of the tracks in the first region is selected such that the electrically conductive transmitter regions, receiver regions and connecting regions in the first region are transparent to the human eye, wherein in the region of each touch field in the first layer one of the electrically conductive transmitter regions and one of the electrically conductive receiver regions are formed, which are galvanically isolated from each other on both sides of a gap separating these, wherein n transmitter regions of different touch fields in the first layer are electrically connected to each other via one of the electrically conductive connecting regions formed in the first layer and to a contact region formed outside the first region in the first layer and m receiver regions of different touch fields in the first layer are electrically connected to each other via one of the electrically conductive connecting regions formed in the first layer and to a contact region formed outside the first region in the first layer, wherein n is ≥2 and m is ≥2, wherein the touch fields are arranged according to a 2-dimensional matrix with two or more columns and with two or more rows, wherein in the case of the touch fields of a first group of touch fields the transmitter region is arranged in each case to the left of the receiver region, and in the case of the touch fields of a second group of touch fields the transmitter region is arranged in each case to the right of the receiver region, wherein in each of the rows of the matrix touch fields of the first group and of the second group are arranged alternating next to each other, with the result that at the boundary between two touch fields of the same row, in each case, two transmitter regions or two receiver regions lie opposite, and wherein in a first partial region of the matrix both in the direction of the rows and in the direction of the columns, touch fields of the first group and second group are arranged alternating next to each other, with the result that at the boundary between two touch fields of the same row, two transmitter regions and two receiver regions lie opposite alternating, wherein the matrix has two or more rows and two or more columns in the first partial region.

It is evident from FIG. 1 how the supply lines 3a to 3m are bundled in the outer part of the transparent region of the layer electrode. With increasing depth or number of rows of the layer electrode or of the touch sensor, there is now an increasing bundling of supply lines in the outer part of the transparent region. If a further row Z0 were to be added in FIG. 1, the transmitter-electrode array 2 of the row Z1 would have to be split up into a left and a right half with separate supply lines. Additional lines 3d1, 3d2 and 3j1 and 3j2 would then result. The density of supply lines 3 in the outer region of the transparent region of the layer electrode would then be "5" instead of the density shown as "3" in FIG. 1.

In order to overcome the disadvantages associated with this construction principle, bridges are provided in the transparent region of the layer electrode according to the present invention. This is represented in FIG. 2.

Figure 2:
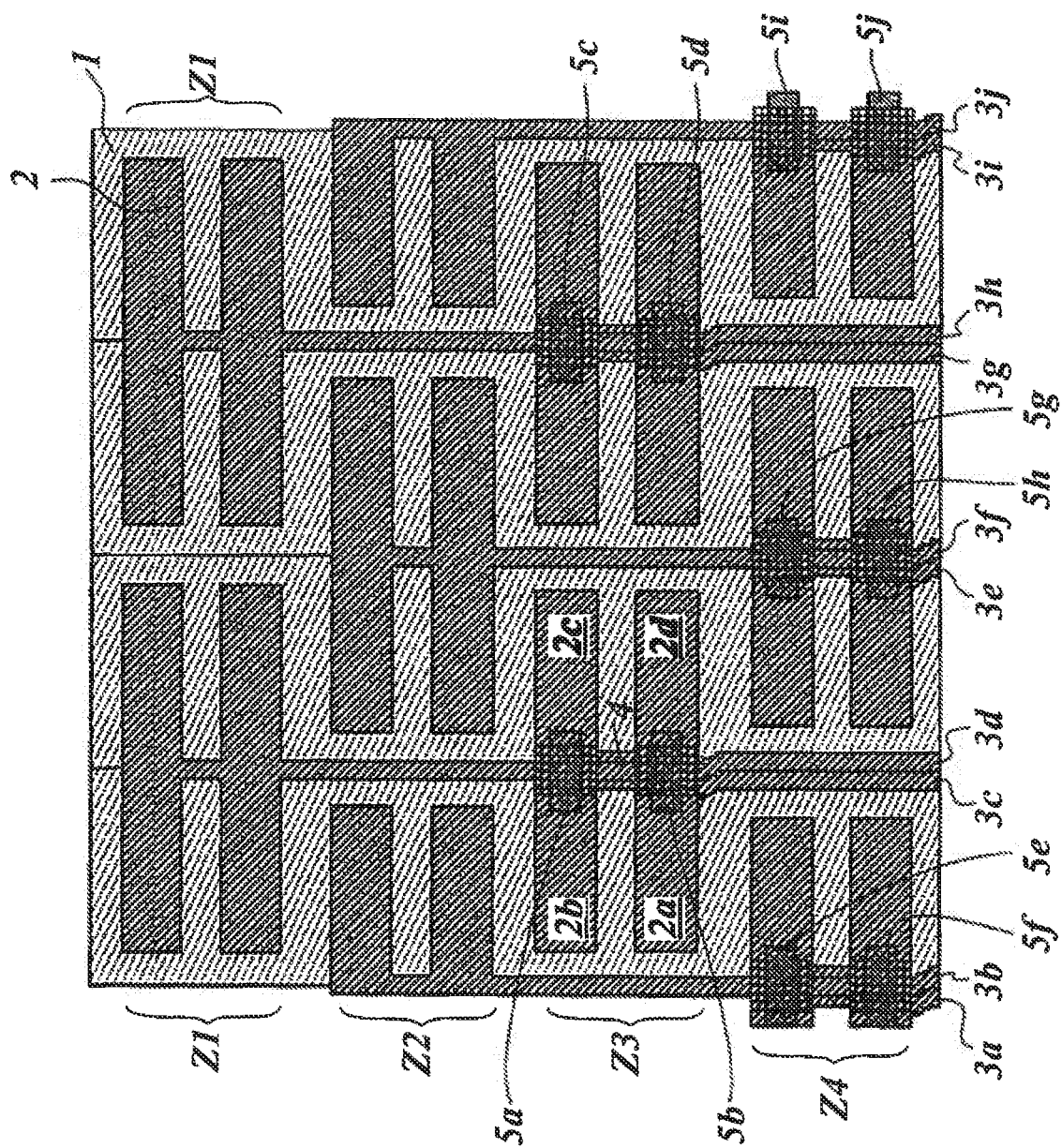
FIG. 2 shows a section from a layer electrode with the electrode arrays according to the state of the art, but with supply lines and bridges according to the present invention and thus with a greatly reduced number of supply lines compared with the layout of FIG. 1.

FIG. 2 correspondingly shows the same section as FIG. 1 of a constructed layer electrode—analogously to what is shown in FIG. 1. The same rows Z1 to Z4 and the same electrode arrays 1 and 2 are to be recognized. Only in the region of the supply lines 3 has anything changed: instead of the bundling of the supply lines 3a to 3m in the outer part, here bridges 5a to 5j appear, which form the electrically galvanic connection of some inner, second electrode arrays to first electrode arrays connected directly via supply lines 3. FIG. 2 shows an embodiment of the bridges which preferably bridge electrode subarrays of a touch field to each other, with the result that only one supply line 3 is necessary for each touch field, independently of whether or not the touch field is divided into two halves by supply lines 3 guided through.

In the matrix shown in FIG. 2, only supply lines 3a to 3j are guided through the bridging into the edge region (not shown), with the result that the thickness of the bundles of supply lines is already perceptibly reduced compared with FIG. 1.

To explain: for example the transmitter electrode 2 in row Z3 comprises 4 electrode subarrays 2a, 2b, 2c and 2d. According to the state of the art, as can be recognized from FIG. 1, these arrays were connected via two supply lines 3c and 3e, as well as via a bar 4. According to the present invention, it is achieved through the bridges 5a and 5b that the supply lines 3c and 3e coincide in a supply line 3c. Via the bar 4, one of the bridges 5a or 5b is even redundant, as all four electrode arrays 2a to 2d are galvanically connected to the supply line 3c via the bar and one of the bridges.

Analogously, on the right side in FIG. 2, the transmitter-electrode arrays of the right transmitter electrode of row 3 are joined by bridging and/or bar formation, with the result that according to the invention, instead of the supply lines 3i and 3k from FIG. 1, only the supply line 3g is necessary. Alternatively, the supply line 3g could also be dispensed with in the transparent region via bridge formation.

According to the embodiment shown here, the interconnection of the supply lines 3g and 3c from FIG. 2 tales place in the edge region of the layer electrode (not shown). For this, a further bridge may be necessary in the edge region R.

According to this embodiment of the invention, an at least proportional interconnection of electrode arrays or electrode subarrays—forming a row and/or forming a column—is thus provided in the transparent region of the layer electrode and/or in the edge region of the layer electrode.

Through the reduction of the supply lines 3a to 3m from FIGS. 1 to 3a to 3j according to an embodiment example of the invention as shown in FIG. 2, the following advantages are achieved:

improved touch resolution and/or improved touch signal in the outer part of the transparent region of the layer electrode;

a higher number of touchscreens comprising touch fields become realizable;

reduction of the bridges and/or vias necessary in the edge region, with the result that the space requirement in the edge region of the layer electrode is reduced.

Figure 3:
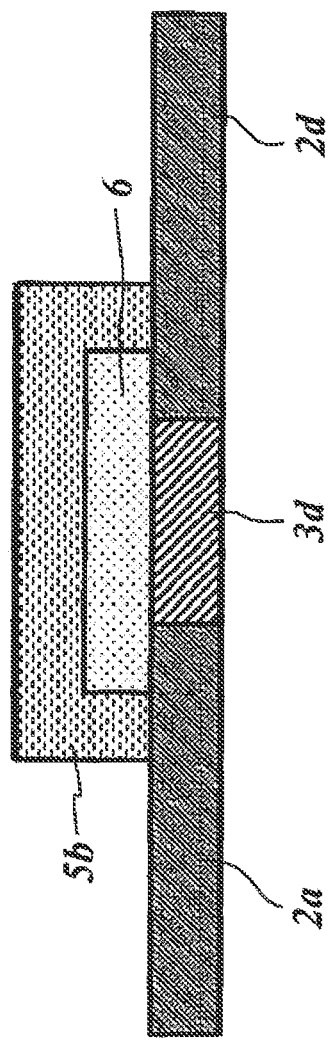
FIG. 3 shows in detail a bridge from for example a layer electrode, as shown in FIG. 2, but in cross section rather than from above FIG. 4 comprises the representations 4a, 4b, 4c and 4d of the individual electrodes and/or plies of a "4×4" matrix comprising four rows and 4 columns and finally the overall view as FIG. 4.

FIG. 3 shows a detail from FIG. 2 in cross section. The two transmitter-electrode arrays 2a and 2d can be recognized, which are galvanically isolated from each other by the supply line 3d which connects the transmitter-electrode arrays from row 1 to the edge region (not shown) and thus to the controller (also not shown).

The two electrode arrays 2a and 2d are electrically connected to each other by the bridge 5b. An isolator 6 electrically isolates the bridge 5b from the supply line 3d. The isolator 6 and/or the bridge 5b are preferably formed from at least partially transparent materials, like the transparent region of the layer electrode, on which they are located.

For example, the bridge is made of a highly conductive PEDOT:PPS blend or of a material with electrically conductive nanoparticles, such as for example metallic nanoparticles or for example nanowires. In particular, highly conductive metals such as copper and/or silver as well as any alloys come into question in this case.

If the requirements for transparency of the touchscreen are only low, such as for example in the case of touch sensors that are only translucent, the bridge 5b can however also be formed from a non-transparent material, such as for example conductive silver or carbon black.

Figure 4:
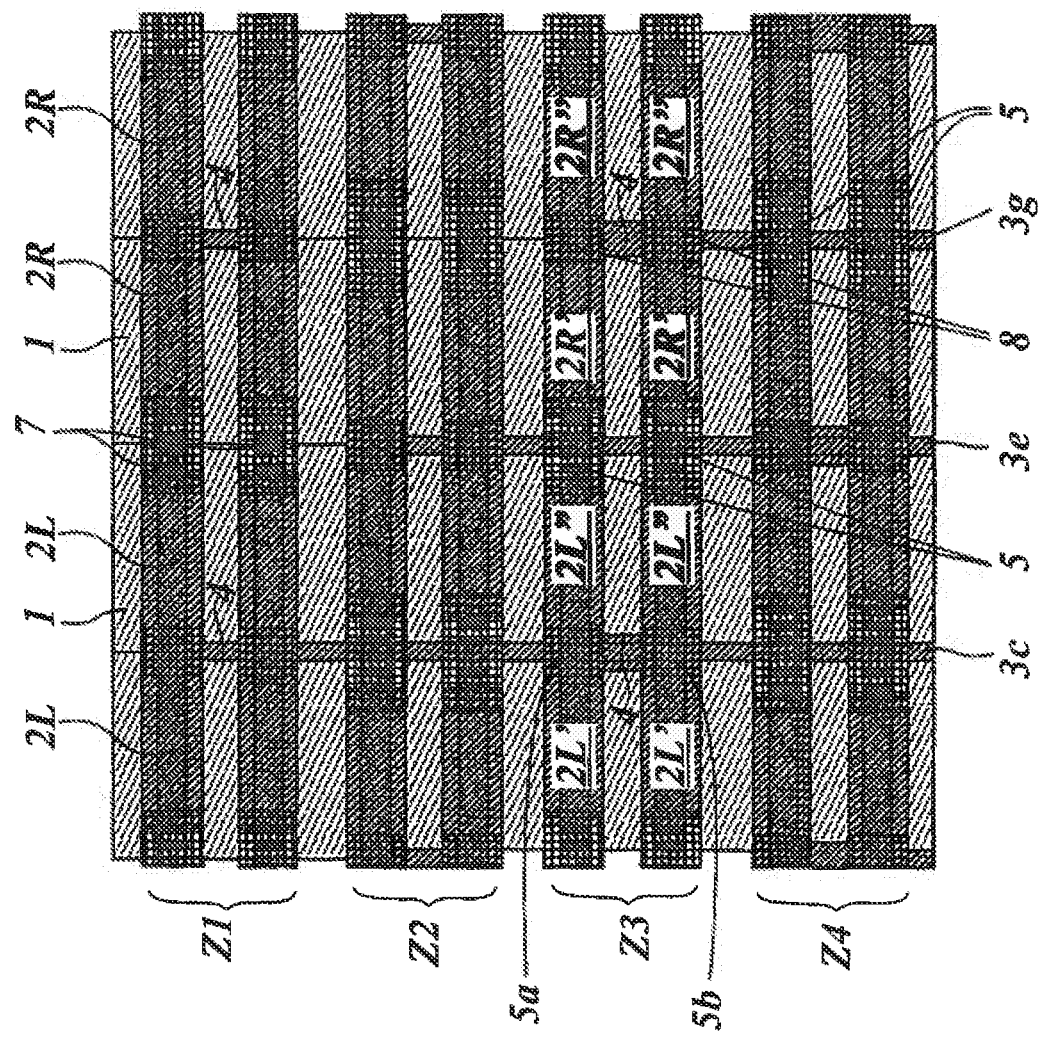

FIG. 4 shows a further embodiment according to the invention with bridges within the transparent region of the layer electrode and optionally also in the edge region of the layer electrode, which is not shown in the Figure or part-FIGS. 4a to 4d, however, for the sake of clarity. FIG. 4 is to be explained below in comparison with FIG. 2:

In FIG. 2, the transmitter electrode 2 of the row Z1 is contacted separately via a supply line 3h, as there is no direct electrical connection between the transmitter electrodes 2 on the right and left in the field of vision. In FIG. 4 this is continued such that the transmitter electrodes 2R on the right side are connected to the transmitter electrodes 2L on the left side via bridges 7. In this case, these bridges do not bridge a supply line 3h or 3d as represented in FIGS. 2 and 3, but the receiver electrodes 1 of the respective rows and/or columns. The transmitter electrodes 2L and 2R of the row Z1 are then connected to all of the 8 electrode arrays shown overall in FIG. 4, via the supply line 3c at the edge region. The transmitter-electrode arrays 2R not connected to a supply line therefore belong to the second electrode arrays of the transparent region, which are connected to first electrode arrays such as the transmitter-electrode arrays 2L at supply lines via bridges 7.

The situation is analogous in row Z3 of FIG. 4: the transmitter electrodes 2L and 2R of the row Z3 are electrically connected to each other and to the supply line 3g via the bridges 5.

Using the example of a transmitter-electrode subarray 2L', the course of an indirect electrical connection of an electrode array to a supply line 3g is outlined by way of example: the transmitter electrode 2L' is connected to the transmitter electrode 2L" via the bridges 5a and 5b and/or bar 4. In this case the bridges 5a and 5b bridge the supply line 3c. The supply line 3d from FIG. 2 is dispensed with, as the transmitter electrode 2L" is connected to the two halves of the transmitter electrodes 2R" via bridges 5. The bridges 5 in row 3 bridge the supply line 3e which leads to the row Z2.

The two halves of the transmitter electrode 2R" are directly galvanically connected to the two halves of the transmitter electrode 2R' in the same plane, the bridges 5c and 5d from FIG. 2 can be dispensed with, as a supply line 3h to row 1 is no longer necessary, as the electrical connection of two electrode arrays such as the transmitter electrodes 2R in row 1 is effected via the bridges 7.

In addition, a bar 4' connects the upper and lower halves of the transmitter electrodes 21R' and 2R" of the row Z3 towards the supply line 3g, which leads through under the bridges 5 of the row Z4. For optical homogenization, according to the embodiment shown in FIG. 4, blind bridges 8 without any substantial electrical function, are also introduced.

Therefore, in FIG. 4, 3 different types of bridges are drawn in, which can all occur in the transparent region of an embodiment example of a layer electrode according to the present invention:

Type A of the electrically conductive bridge, which bridges the electrode subarrays and occurs in the transparent region of the layer electrode, is the bridge named with the reference sign 5 which—as can also be seen in FIG. 2—connects two electrodes via a supply line which leads to an electrode of another row.

Type B of the electrically conductive bridge, which bridges electrode subarrays and occurs in the transparent region of the layer electrode, is the bridge named with the reference sign 7 which—as can be seen in FIG. 4, row 1—connects two—for example—transmitter electrodes over intermediate receiver electrodes.

Type C of the—possibly also electrically conductive—bridge, which bridges the electrode subarrays and occurs in the transparent region of the layer electrode, is the bridge named with the reference sign 8 which does not have an electrical, but only an optical function. This is a redundant bridge, which, however, can for example, if necessary, take over an electrical function in the case of line damage to the layer electrode.

In order to be able to better appreciate the complexity of FIG. 4, in FIGS. 4a to 4d, the individual planes, as shown for example in detail in FIG. 3, are once again represented separately.

In FIGS. 4a to 4d, the symbols "cross in circle", "cross in triangle" and "cross in square" indicate that in the case of register-accurate superimposition of these symbols the four functional planes of FIGS. 4a to 4d form the complex layer system of FIG. 4.

Figure 4A:
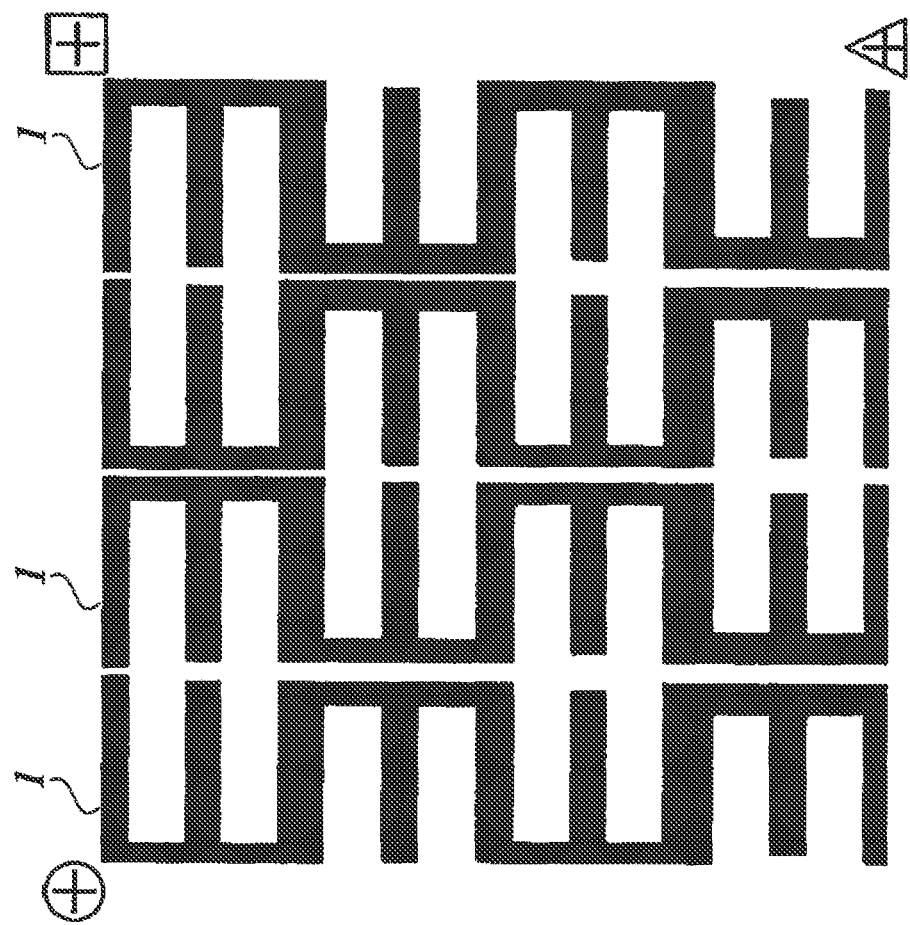
Figure 4B:
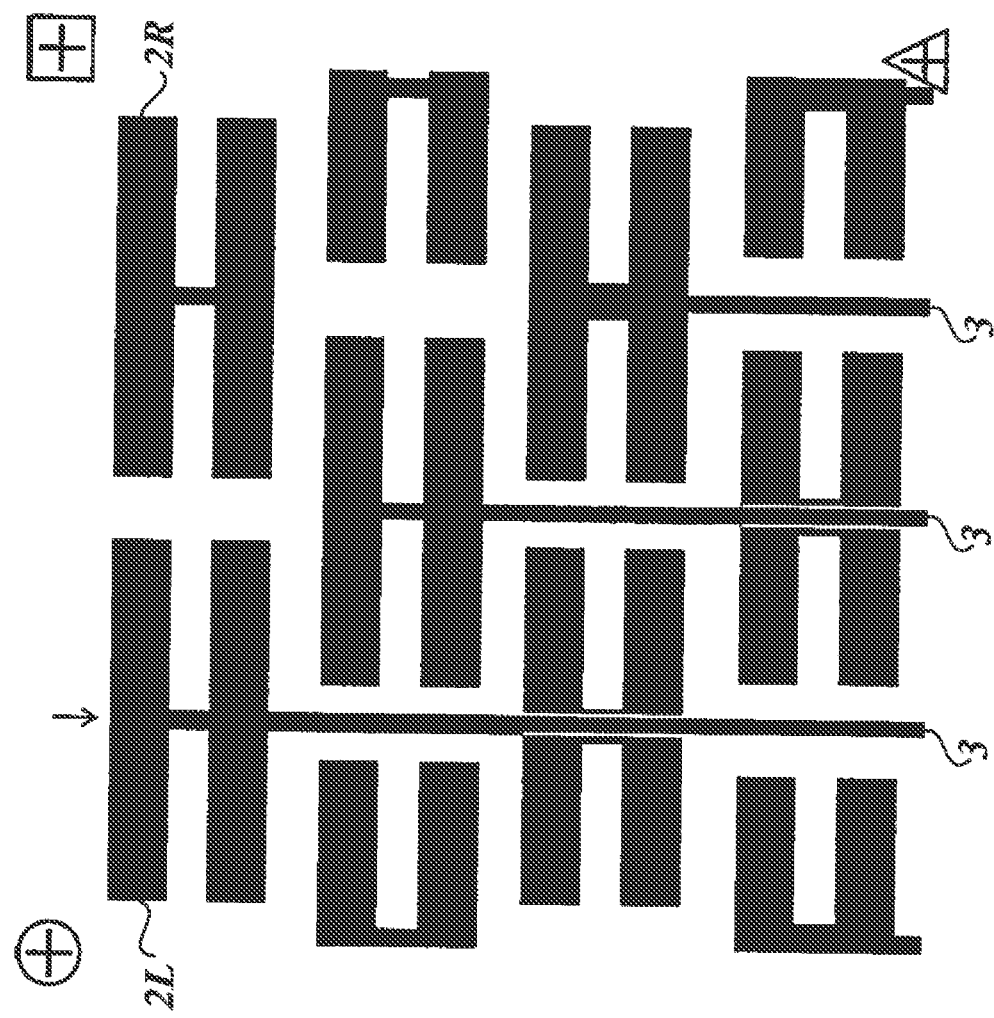
Figure 4C:
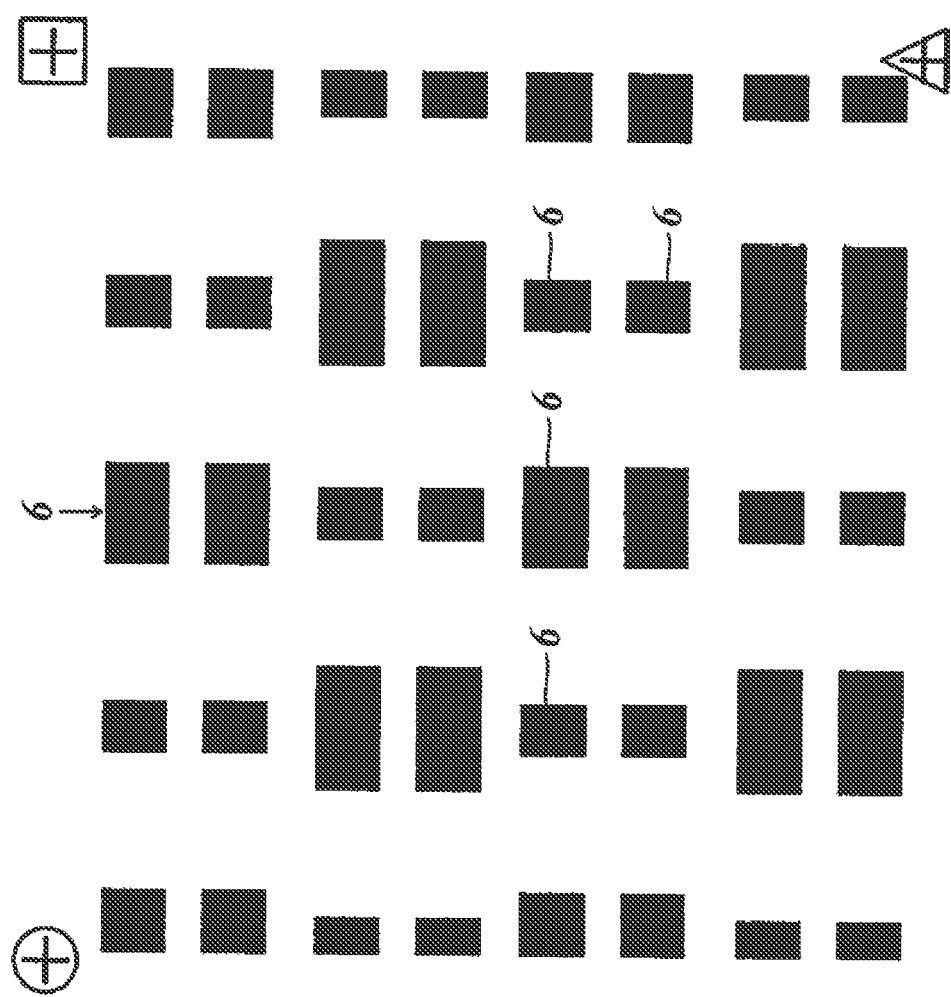
Figure 4D:
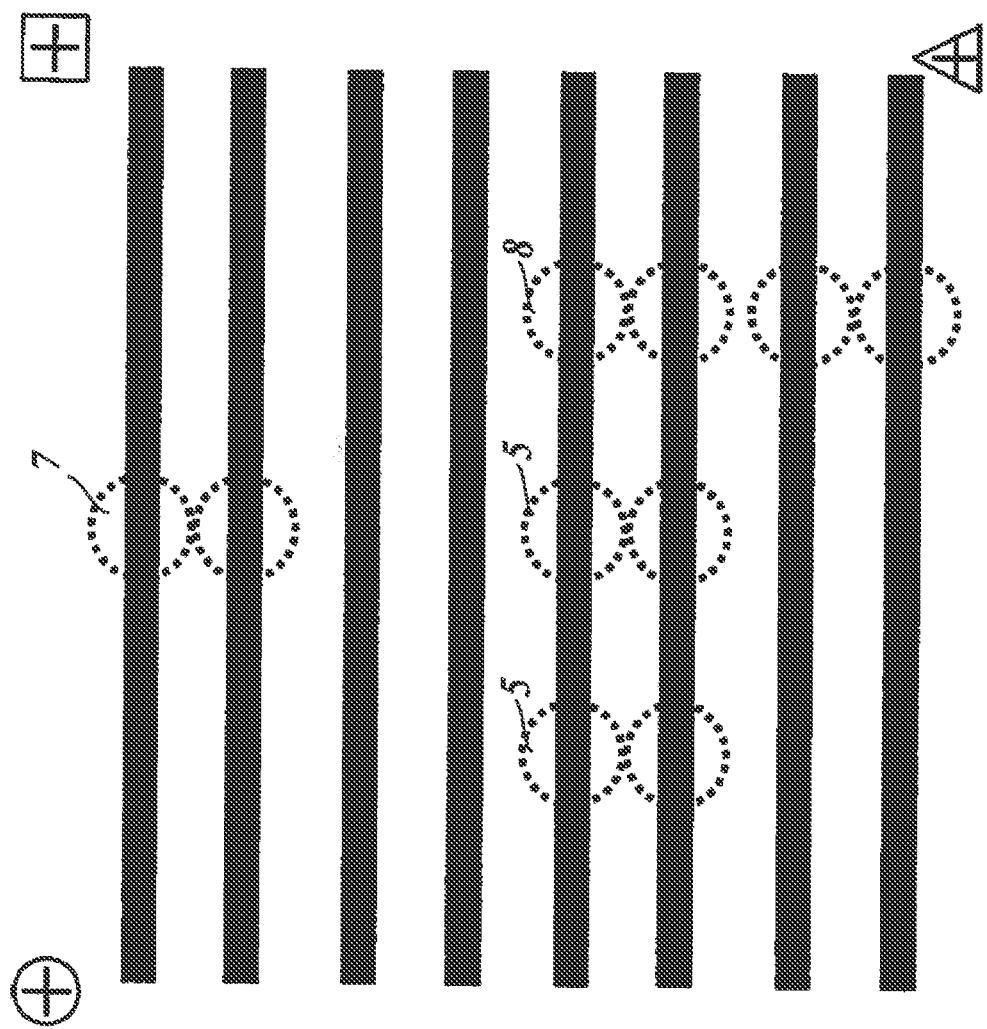

In this case, FIGS. 4a and 4b show one plane, FIGS. 4c and 4d each show one further plane, with the result that FIGS. 4a to 4d together represent 3 planes.

FIG. 4a shows exclusively receiver electrodes 1 which, in a first plane, are for example formed of PolyTC® metal mesh on a PET substrate. These conductive structurable layers are described in DE 10 2009 014 757.8.

For this, FIG. 4b exclusively shows the transmitter electrodes 2L and 2R with the associated supply lines which are formed, for example, from the same material and/or in the same plane as the receiver electrodes, but are galvanically isolated from the latter. In the embodiment example shown here, only the transmitter electrodes are divided into first and second electrode arrays which, according to the invention, differ in that the first electrode arrays are directly connected to supply lines 3, whereas the second electrode arrays are galvanically connected to the first electrode arrays via bridges 5, 7—not shown in FIG. 4b for the sake of clarity—but not directly to supply lines.

According to the preferred embodiment of the invention shown here, FIGS. 4a and 4b together show a plane on which the transmitter and receiver electrodes, together with supply lines, are located.

It can be clearly recognized in FIG. 4b, that not all the transmitter-electrode subarrays are connected to supply lines. For example, at the top right, the transmitter-electrode subarrays marked 2R are without supply line, while 2L has a supply line 3 leading vertically downwards into the edge region (not shown).

According to the embodiment example shown in FIG. 4 with FIGS. 4a to 4d, a pattern of isolating material 6, represented in FIG. 4c, is located in a second plane, above that of FIGS. 4a and 4b. This plane corresponds to the isolator 6 in FIG. 3. FIG. 4d finally shows the conductive bridges in the transparent region of the layer electrode, which are arranged in a third plane. The bridging regions 5, 7 and 8 are drawn in here by way of example.

In the present embodiment example according to FIG. 4d, the bridging material is printed on in the form of continuous horizontal strips. Alternatively, it can naturally also be provided to provide bridging material only locally around the respective locations.

While FIG. 4 shows only one section, FIG. 5 shows a wider representation of the same sensor design. The different bridge types described above are once again evident from the representation:

a) the bridges 5 connect two transmitter electrodes over a supply line, which leads to a transmitter electrode in a deeper plane, thus lying further in, with another row number. For example, these include the bridges 5a and 5b from FIG. 4.

b) the bridges 7 connect two transmitter electrodes over intermediate receiver electrodes; an example of this is the bridge 7 in the top row of FIG. 4.

c) the bridges 8 are "blind bridges" without an actual electrical function. Examples of these are the bridges 8 from FIG. 4. They only serve so as not to interrupt the bridge grid optically and thus to contribute to an optical homogenization.

A further construction principle now emerges from FIG. 5, which is explained using the example of row Z1 from FIG. 5: the transmitter electrodes 40, 41, 42 and 43 are directly coupled to each other via the bridges 7. The connection to the edge region R is then effected via the supply line 3z1, which corresponds to the supply line 3c from FIG. 4. According to an embodiment of the invention, however, it is provided to realize a redundant connection of this row Z1 via the additional supply line 3z1'. With this type of redundancy it is ensured that, even in the case of bridge 7 not being perfectly formed, a connection of the row is guaranteed. Through this redundant connection by means of an additional supply line, a first electrode array is produced from a second electrode array, for example, and/or a redundant "dummy" bridge from an electrically charged bridge.

On the other hand, this embodiment also offers a significant functional advantage: in particular, if the bridges are formed transparent, their material as a rule provides significantly lower conductivities than silver, from which for example the conducting tracks of the PolyTC® of the electrode plane of the layer electrode is formed. In the case of a large number of bridges, a large series resistance consequently accumulates along a row. If the row Z1 were connected only via 3, a clear voltage drop from left to right in row Z1 in the sensor of FIG. 5 would then result, which in turn impairs the functionality of the touch sensor. The additional supply line 3z1', which is electrically joined to the supply line 3z1 in the edge region R, reduces this voltage drop along the row Z1.

Analogously, in FIG. 5 the row Z2 is connected via the supply lines 3z2 and 3z2', the row Z3 via the supply lines 3z3 and 3z3', and the row Z4 via the supply lines 3z4, 3z4' and 3z4".

Through the present invention, the possibility is shown for the first time, how the detection accuracy of the touchscreen is virtually independent of an increase in the number of electrode arrays in the touchscreen. This is achieved in that, within the transparent field of view of the touchscreen, conductivity centres are formed through first electrode arrays which are connected directly to supply lines in the edge region and to a controller. Other, so-called second electrode arrays are then galvanically connected to these conductivity centres via bridge formation, with the result that an electrical signal to the controller from virtually any electrode array from the accumulated resistance to the line of an electrical signal to the controller is identical. For this, the number of bridges leading from an electrode array of the second, i.e. not directly connected type, to the controller, is limited by specifying an accumulated maximum resistance.

The invention claimed is:

1. A layer electrode for a touchscreen having an inner transparent region and an outer non-transparent edge region, the layer electrode comprising:
   a first transmitter electrode array disposed within the inner transparent region;
   a first supply line electrically connected to the first transmitter electrode array and extending into the outer non-transparent edge region;
   a second transmitter electrode array disposed within the inner transparent region, the second transmitter array comprising a first electrode subarray and a second electrode subarray, the first electrode subarray being separated from the second electrode subarray by the first supply line extending to the first transmitter electrode;
   a transparent electrically conductive bridge connecting the first electrode subarray of the second transmitter electrode to the second electrode subarray of the second transmitter electrode, the transparent electrically conductive bridge spanning over the first supply line;
   a second supply line electrically connected to at least one of the first electrode subarray of the second transmitter electrode or the second electrode subarray of the second transmitter electrode and extending into the outer non-transparent edge region;
   a receiver electrode array separating the first transmitter electrode array from the second transmitter electrode array; and
   a non-transparent electrically conductive bridge provided in the outer non-transparent region.

2. The layer electrode according to claim 1, wherein at least three plies are provided, the at least three plies comprising a first ply with electrode arrays, an isolating ply lying thereon, which has a structuring through which a third, electrically conductive ply on the isolating ply galvanically bridges the electrode arrays of the first ply.

3. The layer electrode according to claim 2, wherein the first ply is made of a transparent film which comprises a transparent carrier which is covered with transparent conducting tracks such that sufficient transparency for a touchscreen and at the same time electrical conductivity are guaranteed.

4. The layer electrode according to claim 1, wherein the electrode arrays are arranged at least partially in lines.

5. The layer electrode according to claim 1, wherein the supply lines are arranged substantially perpendicular, to the lines.

6. The layer electrode according to claim 1, wherein a ratio of the number of first electrode arrays to the number of second electrode arrays is in the range of from 0.1:1 to 2:1.

7. The layer electrode according to claim 1, wherein the bridges are distributed within the transparent region of the layer electrode such that an overall resistance of a contacting of an electrode array does not exceed a value of 12 kOhm.

8. The layer electrode according to claim 1, wherein blind bridges are provided for optical homogenization of the layer electrode.

9. The layer electrode according to claim 1, wherein the electrode arrays are present in lines of a matrix, wherein the lines of the matrix and the longitudinal axis of the transparent region have an angular offset to each other.

10. The layer electrode according to claim 1, wherein the density of supply lines is distributed approximately evenly in the entire edge region.

11. The layer electrode according to claim 1, wherein, in the transparent region, the bridges at least of one line are realized in the form of a horizontal strip.

12. The layer electrode according to claim 1, wherein, in the transparent region, at least one bridge is realized only locally around the location to be bridged.

13. The layer electrode according to claim 1, wherein at least one redundant connection of an electrode array is provided via an additional supply line.

\* \* \* \* \*